United States Patent [19]
Fridrich

[11] Patent Number: 6,101,602
[45] Date of Patent: Aug. 8, 2000

[54] DIGITAL WATERMARKING BY ADDING RANDOM, SMOOTH PATTERNS

[75] Inventor: Jiri Fridrich, Johnson City, N.Y.

[73] Assignee: The United States of America as represented by the Secretary of the Air Force, Washington, D.C.

[21] Appl. No.: 08/986,695

[22] Filed: Dec. 8, 1997

[51] Int. Cl.$^7$ ........................................ H04L 9/00
[52] U.S. Cl. ........................................ 713/176
[58] Field of Search ............... 380/4, 5, 28, 51, 380/54, 43, 48, 200, 201, 263; 713/176, 168

[56] References Cited

U.S. PATENT DOCUMENTS

| | | | |
|---|---|---|---|
| 5,365,589 | 11/1994 | Gutowitz | 380/43 |
| 5,613,004 | 3/1997 | Cooperman et al. | 380/28 |
| 5,680,462 | 10/1997 | Miller et al. | 380/48 |
| 5,687,236 | 11/1997 | Moskowitz et al. | 380/28 |
| 5,825,892 | 10/1998 | Braudaway et al. | 380/51 |
| 5,859,920 | 1/1999 | Daly et al. | 382/115 |
| 5,889,868 | 3/1999 | Moskowitz et al. | 380/51 |
| 5,915,027 | 6/1999 | Cox et al. | 380/54 |

OTHER PUBLICATIONS

Walter Bender, Daniel Gruhl, & Norishige Morimoto, "Techniques for Data Hiding", Massachussetts Institute of Technology, Media Lab, Cambridge MA 02139 (23 pages).
Ingemar J. Cox, Joe Kilian, Tom Leighton, & Talal Shamoon, "Secure Spread Spectrum Watermarking for Multimedia", NEC Research Institute Technical Rpt 95–10 (33 pages).

*Primary Examiner*—Tod B. Swann
*Assistant Examiner*—Matthew Smithers
*Attorney, Agent, or Firm*—Harold L. Burstyn

[57] ABSTRACT

A digital image is "watermarked", that is, authenticated by an embedded pattern. The pattern is created by hashing the image and adding a signature element. Manipulating this result by the seed for a random number generator leads to an initial two dimensional random black-and-white pattern. This pattern is manipulated by a cellular automaton and smoothed before being added to the original image. To determine whether the image is authentic, one retrieves the watermark by subtracting the watermarked image from the original to obtain the difference. The value of the correlation between the difference thus obtained and the smoothed pattern determines the presence or absence of the watermark.

22 Claims, 4 Drawing Sheets

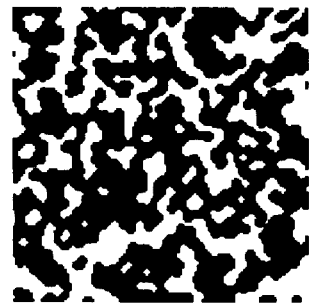
Figure 1(e)
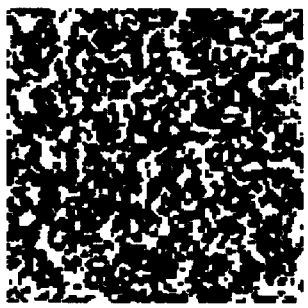
Figure 1(b)
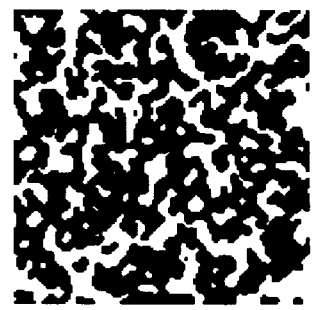
Figure 1(d)
Figure 1(a)
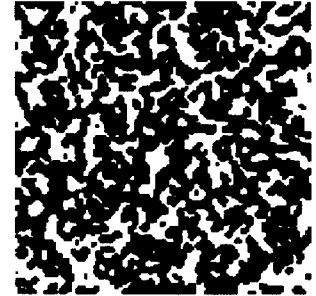
Figure 1(c)

DIGITAL WATERMARKING BY ADDING RANDOM, SMOOTH PATTERNS

STATEMENT OF GOVERNMENT INTEREST

The invention described herein may be manufactured and used by or for the Government for governmental purposes without the payment of any royalty thereon.

BACKGROUND OF THE INVENTION

The present invention relates to authenticating digital data, especially digital images, and, in particular, relates to authenticating such data by means of embedded code that functions to authenticate the data in a manner similar to that of a watermark in a piece of paper.

Digital images, digital video, soundtracks, and any other documents or files in an electronic format can be easily copied. Even though such copying may violate copyright laws, it is widespread. The ease with which electronic files may be copied without loss of content significantly contributes to illegal copying.

Furthermore, a recipient of even a lawfully transmitted digital document may need to authenticate it. That is, the recipient must determine that the document came from the person who is alleged to have sent it and not from someone trying to masquerade as that person. (Such falsification of the sender's identity is known as spoofing.) One can authenticate a communication by classical cryptographic means, such as combining a public-key system with a hash function.

With digital watermarking one can distribute a document without encryption. Thus digital watermarking is especially useful for protecting property rights in images, video-streams, and audio tracks. The watermark is embedded in the image and not just appended appended to the document, as a cryptographic signature is. The watermark stays in the document as long as the document is recognizable. Therefore one can prove that an image, whether still or moving, or a phonorecord is an unauthorized copy or derivative work of a copyrighted work.

These problems of preserving the rights of authors and of assuring recipients that they have not been spoofed raise the question of authenticating digital data. Can a method be found to sign or mark the electronic document to indicate its origin unambiguously? Can such a sign or mark be protected against tampering?

An electronic document can be signed or marked either by public-key encryption or digital watermarks. The present invention is directed to methods of authentication based on digital watermarks. Such a watermark must be embedded in the document in an invisible form. That is, it should not interfere with the content of the original, and adding a watermark to a document should not cause any visible artifacts to appear.

The most important requirement for digital watermarks is that they be robust with respect to common procedures of image processing. Such procedures include kernel filtering, lossy compression, conversion between digital and analog format, resampling, cropping, affine transforming, removing or adding features, adding noise, copying, and scanning.

The second important requirement for digital watermarks is that they be non-removable even with a complete knowledge of the watermarking algorithm. This requirement can be met if the algorithm for embedding the watermark is made cryptographically strong by means of a secret key.

The purpose of a digital watermark is to prove the ownership of digital data. A pirate may crop some small portion of the image, adjust colors, brightness, change the resolution, and apply various filters. Such modifications will of course disturb the watermark. Nevertheless, so long as the original portion of the image is recognizable, the watermark should be detectable by using sophisticated algorithms. The detection itself is an algorithmic process that depends on a secret password chosen by the document's author.

To prove that a watermark is present in an image, one must show that a certain relationship among pixels (the reconstructed watermark) can occur by chance with an extremely low probability. It should be computationally infeasible to remove the watermark, even with complete knowledge of the watermarking algorithm, unless one has the secret password. In other words, breaking the watermark should be nearly impossible without the password even if one knows the algorithm. This principle, called after Kerckhoff, is commonly accepted in the field of cryptography.

A robust watermarking algorithm can settle a dispute about ownership of a digital document. Let A create a digital image and watermark it with his key. If B gets hold of the watermarked image to steal it (i.e., claim ownership), the best B can do is to embed his watermark into the image and claim that he can prove ownership. If the watermark is robust, A can prove his ownership to a judge or other authority because A can detect his watermark in the image marked by B, while B cannot do that for the image that A has. Since we trust that the watermark cannot be completely removed unless one modifies the image beyond recognition, A proves he owns the image. The watermark's robustness to change plays a crucial role in this dispute, because, if B can filter out the original watermark, the watermark is useless.

The best watermarking algorithms currently available are based on spread-spectrum techniques (R. C. Dixon., *Spread Spectrum Systems with Commercial Applications* (New York, Wiley, 1994)). Hartung and Girod ("Digital Watermarking of Raw and Compressed Video", *Proc. European EOS/SPIE Symposium on Advanced Imaging and Network Technologies,* Berlin, Germany, October 1996) describe methods for marking digital video MPEG-2 in a series of papers. Their method uses direct sequence encoding in the spatial domain. It is well known that any watermarking scheme can be interpreted as pattern overlain with a specific pattern. In Hartung and Girod's method, the pattern is a linear combination of basis functions that are orthogonal to typical images. While this method enables extraction of a watermark without the original image, it is less robust with respect to image modifications. Also, their technique is vulnerable to collusion attack—averaging several watermarked copies of the same document in a hope to "average out" the watermark.

W. Bender, D. Gruhl, and N. Morimoto ("Techniques for Data Hiding," 2420 *Proc. SPIE* 40 (1990)) describe techniques for hiding data in digital images and audio streams. Their patchwork method is a "stochastic" spread-spectrum technique in the spatial domain. No image escrow is needed. Their method appears to be vulnerable to the collusion attack. Another of their methods is called texture block coding. A small, random-looking area is copied into a different random-looking area of the image. This copying creates a correlation that will not be disturbed by any image-processing operation except cropping. If those areas contain an 8×8 square, the method will also be robust with respect to JPEG compression of any quality. No image escrow is needed. However, the watermark is easy to detect and remove. Another disadvantage is that it is image dependent, and not all images will have the required random looking areas.

Pitas and Kaskalis ("Signature Casting on Digital Images", *Proc. IEEE Workshop on Nonlinear Signal and Image Processing,* Neos Marmaras, Halkidiki, Greece, Jun. 20–22, 1995) have described a method for applying signatures to digital images. The pixels of a digital image are divided into two disjoint sets of the same size. Pixels in one set are offset by an amount k while the pixels in the other set are left untouched. Although the authors report no robustness study, the similarity of this technique to the patchwork of Bender et al. suggests that the method will have similar robustness.

Zhao and Koch ("Embedding Robust Labels Into Images For Copyright Protection," *Proc. Int. Congr. on IPR for Specialized Information, Knowledge and New Technologies* (Vienna, Austria, Aug. 21–25, 1995)) propose a watermark based on JPEG compression. One bit of information is embedded into middle frequencies of pseudo-randomly chosen 8×8 pixel blocks. In each block, a triple of frequencies obtained by discrete cosine transform is chosen out of 18 predetermined frequencies. Their coefficients are modified so that their mutual relationship encodes one bit of information. Since the 18 predetermined frequencies are chosen from the middle range, this method will be less robust and more vulnerable to noise than the method of Cox et al. described below.

Zhao and Koch ("Towards Robust and Hidden Image Copyright Labeling," *Proc. IEEE Workshop on Nonlinear Signal and Image Processing* (Neos Marmaras, Halkidiki, Greece, Jun. 20–22, 1995)) describe another method, designed for black and white images, where the relative frequencies of black and white pixels in pseudo-randomly selected 8×8 blocks encode one bit of information. One advantage of this scheme is that no image transformation is involved. On the other hand, the method is vulnerable to collusion of several watermarked images. To overcome this problem, Zhao and Koch propose to choose distributed blocks instead of square blocks. However, this choice makes the method much more sensitive to noise.

M. Kutter et al. (*Digital signature of color images using amplitude modulation, SPIE-EI97 Proceedings*) describe a method for digitally signing color images that uses amplitude modulation. The authors hide the signature in the blue channel of a color image because the human visual system is least sensitive to the blue channel. Their method is clearly more sensitive to noise than are spread-spectrum techniques.

Cox et al. (*Secure Spread Spectrum Watermarking for Multimedia,* NEC Research Institute, Technical Report 95-10) introduced an extremely robust watermark which is based on discrete cosine transform and modifying the low frequencies by a small amount. To recover the watermark, one needs the original image. The authors report that one can reliably extract the watermark from images after 5% JPEG compression! They also find their technique to be robust under resampling, dithering, cropping, and other common image manipulations. The watermark is also resistant to collusion attack (combining multiple watermarked documents to remove the watermark).

The authors make the watermark very robust by inserting it into the low frequencies. That is, they make use of the relative insensitivity of the human visual system to small, gradual changes in intensity. The watermark is a sequence of 1000 samples from a normal distribution with zero mean and unit variance, $\{w_i\}$, encoded into 1000 lowest frequency coefficients $\{v_i\}$ of the discrete cosine transform using the formula $$v'_i = v_i(1 + \alpha w_i), i=1, \ldots, 1000.$$

The constant $\alpha$ adjusts the magnitude of modifications. In Cox et al.'s experiments, $\alpha$ was chosen to be equal to 0.1. To recover the watermark from a modified image, the modified image is first transformed by a discrete cosine transform to obtain modified coefficients $\{v_i^*\}$. The watermark w* extracted from the modified image is compared to the original watermark w with a similarity classification function $$sim(w^*, w) = \frac{w^* w}{\|w^*\|}$$

A conclusion whether or not the modified image contains the watermark w is made based on the value of sim. The authors describe several improvements that make the watermark extraction process more accurate by using robust statistics and by preprocessing w* before calculating sim. The watermark is remarkably robust with respect to analog-digital conversions, requantizing, copying and subsequent scanning, dithering, etc. In a more general scheme, instead of choosing the lowest 1000 frequencies for the watermark embedding, the frequencies are chosen from M lowest frequencies, where M>N. To wipe out the watermark, one would have to randomize the amplitudes of all low frequencies by the maximum amount allowed by the algorithm. The result, however, would be visible deterioration of the image. The authors study the robustness with respect to collusion by averaging 5 watermarked images and testing the presence of each watermark in the image.

The watermark is equivalent to overlaying a pattern spanned by N discrete cosines over the image. The watermark values are used directly as coefficients of that linear combination. The watermark may become visible (or at least detectable) in those areas of the carrier image which were originally uniform or had a uniform brightness gradient. (Quite a large percentage of images do contain such areas).

The watermark cannot be readily removed because the discrete cosines do not generally form a set of linearly independent functions on proper subsets of the image. Nevertheless, one can mount an attack on the watermark. Let us assume that a square area containing K pixels reveals some approximation to the watermark. Since we know that the watermark is spanned by the lowest 1000 coefficients, we can write K equations and thereby narrow down the possibilities for the watermark sequence by a large margin. In the equation below, $f_r = (f_{1r}, f_{2r})$ denotes the rth 2d frequency, and $A_r$ denotes the rth unknown coefficient.

$$g_{ij} = \sum_{r=1}^{1000} A_r \cos\left(\frac{\pi f_{1r}(2i+1)}{2N}\right) \cos\left(\frac{\pi f_{2r}(2j+1)}{2N}\right), (i,j) \in \text{Area}$$

This information may be utilized to remove the watermark beyond detection.

Because none of these prior-art methods is foolproof, there exists a need for a digital watermark that is completely resistant to attack.

SUMMARY OF THE INVENTION

The present invention is a method for injecting invisible robust watermarks into digital images. It can be applied to gray scale as well as to color images. The method of the present invention overcomes some known possible weaknesses in the methods of the prior art.

Therefore, one object of the present invention is to provide a method that authenticates digital data, especially digital images.

Another object of the present invention is to provide a method that authenticates digital data by means of embedded code that functions in a manner similar to that of a watermark in a piece of paper.

These and many other objects and advantages of the present invention will be readily apparent to one skilled in the pertinent art from the following detailed description of a preferred embodiment of the invention and the related drawings, in which like reference numerals designate the same elements.

BRIEF DESCRIPTION OF THE DRAWINGS

FIG. 1 shows examples of five watermarking patterns whose contrast is enhanced to make the patterns visible.

FIG. 1A shows an initial random pattern.

FIG. 1B shows the initial pattern of FIG. 1A after 1 iteration of a cellular automaton with voting rules.

FIG. 1C shows the initial pattern of FIG. 1A after 2 iterations of a cellular automaton with voting rules.

FIG. 1D shows the initial pattern of FIG. 1A after 5 iterations of a cellular automaton with voting rules.

FIG. 1E shows the initial pattern of FIG. 1A after 35 iterations of a cellular automaton with voting rules.

DESCRIPTION OF THE PREFERRED EMBODIMENT

Figure 2:
FIG. 2 shows examples of five watermarking patterns with enhanced contrast.
Figure 2:
Figure 2:
Figure 2:
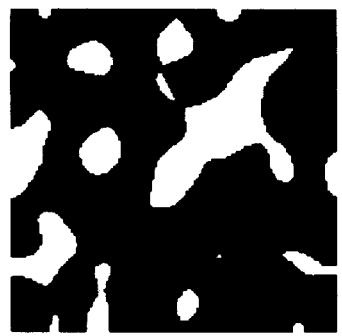
Figure 2:

The prior-art method of Cox et al. is subject to attack, as described above. The attack is based on the fact that the watermark is localized in a relatively small number of coefficients of a publicly known transformation—the discrete cosine transformation. If the choice of transformation functions was kept secret, this type of attack would not be possible.

To make it practical to hide the choice of transformation functions, we would have to design orthogonal function bases that depend on parameters, that is, on a secret key. Another important requirement is that the computation be efficient, similar to fast Fourier type of transforms.

Another way to overcome the vulnerability of prior-art methods of digital watermarking is to view it as pattern overlaying. We do not have to use patterns formed by a linear combination of discrete cosines. We can substitute general key-dependent patterns whose power is concentrated in the low frequencies to guarantee robustness. We begin by transforming a string of bits (a watermark) into a smooth, almost transparent pattern to be overlaid over the carrier image. The watermark bit-string consists of two parts—a hash of the image, and the author's identification number (a signature). The digital watermark will thereby be image-specific, that is, tied to just the one image we want to authenticate. The watermark must depend on the image hash in a complicated manner in order to thwart the kind of attack discussed by S. Craver, N. Memon, Boo-Lock Yeo, and M. Yeung ("Can Invisible Watermarks Resolve Rightful Ownerships?", *IBM Research Report RC*20509, Jul. 25, 1996). The watermark will also contain an important piece of information uniquely connected to the author of the image.

We require a sensitive dependence between the watermark and the resulting pattern. The pattern should not exhibit traces of any regular building blocks. Also, the respective patterns generated by each of two different watermarks should not be correlated.

We seed a random number generator with the watermark bit-string to create an initial black and white two-dimensional random pattern. The pattern is further processed to eliminate high frequencies, for example, by applying low-pass filters to the initial pattern.

In another embodiment, we use the initial pattern as an initial condition for a chaotic spatio-temporal dynamical system that has a tendency to create large-scale smooth structures. In still another embodiment, we use cellular automata with appropriate rules. For example, it is known that voting rules and their modifications can coalesce random patterns into large-scale structures (see T. Toffoli and N. Margolus, *Cellular Automata Machines,* MIT Press, 1987).

FIG. 1A shows a randomly generated initial pattern. This initial pattern was initialized with 0's and 1's that had an equal 50% probability. The random black and white pattern was then processed by a cellular automaton with a voting rule. According to this rule the center element follows the majority of its neighbors. In particular, we count the number, P, of 1's in the 3×3 neighborhood of the center (including the center) and set the center to 0 if P<5; otherwise, we set the center to 1. The cellular automaton with a voting rule always stops after finitely many steps (for a 128×128 image, this number is always less than 40). The resulting pattern is shown together with three intermediate patterns in FIGS. 1B–1E. As can be seen, the initially random pattern has coalesced into several connected areas that form an irregular pattern, which depends on the seed of the random number generator (and therefore on the watermark sequence) in a complicated way. As the last step, we applied a smoothing operation with a 7×7 kernel eight times. The color depth of the resulting image was decreased to 16.

FIG. 2 shows examples of five different patterns. Before we add these patterns to an image, we subtract 8 from the value of each pixel in the pattern so that the pixels of the original, unwatermarked image are modified by no more than ±8 gray levels.

Since the overlaid image has most of its power concentrated in low frequencies, we expect excellent robustness properties similar to the method proposed by Cox et al. [Cox]. Since our overlaid pattern depends on the key in a complicated way, even if the watermark becomes visible in regions of nearly constant luminosity, it does not reveal any information about the key if a cryptographically strong random number generator is used. Another advantage of this technique is that it avoids transformations, which results in a faster and easier implementation.

Figure 3:
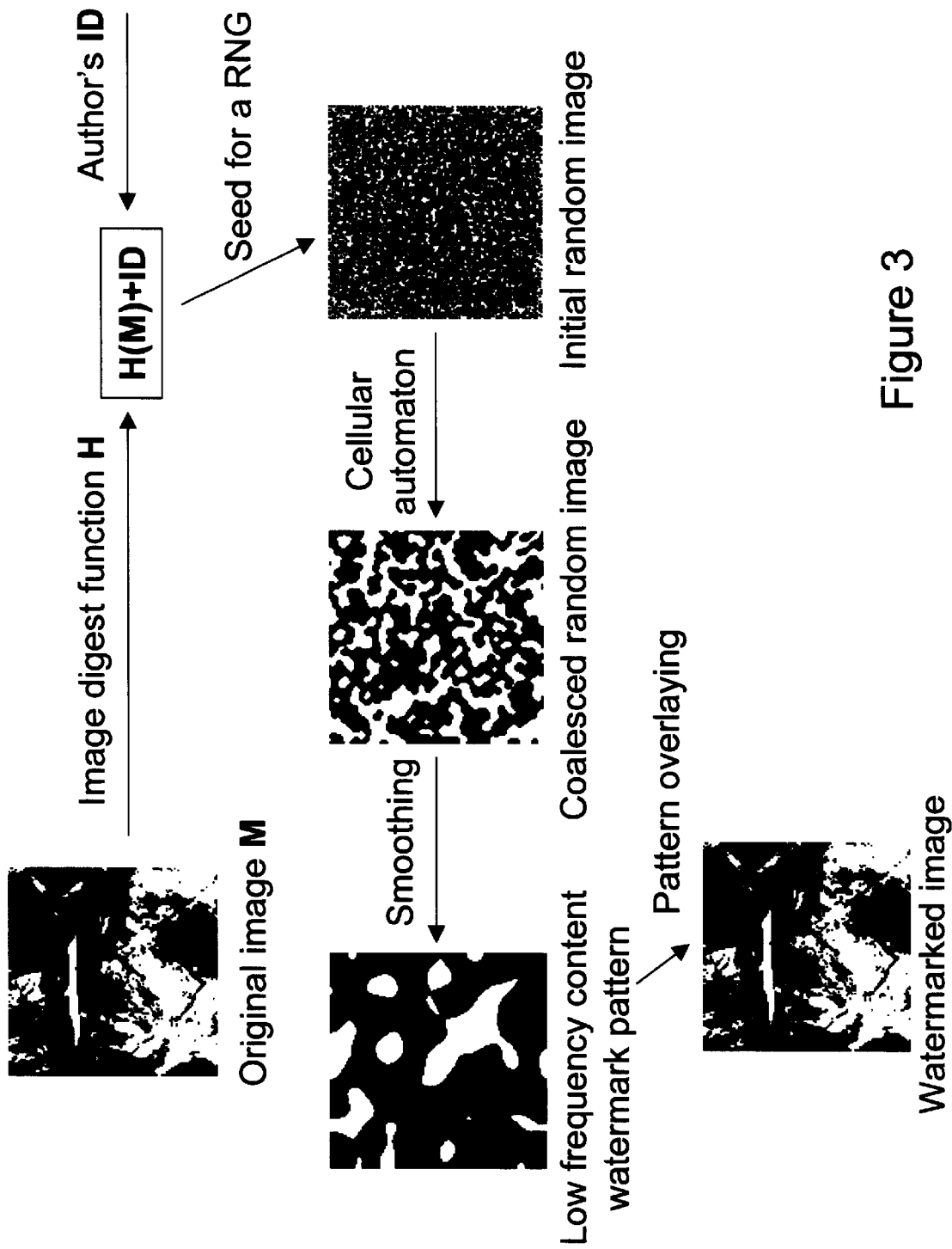
FIG. 3 shows an example of embedding a watermark within an image.

Referring to FIG. 3, the present invention for embedding digital watermark data can be divided into five steps: (1) Generating the watermark sequence=hash of the image +author's signature+other information→ (2) generating an initial two-dimensional black and white random pattern→ (3) coalescing the black and white regions using a cellular automaton→ (4) smoothing the pattern→ (5) rescaling and adding the pattern to the original image.

Step No. 1 proceeds as follows. The watermark is a concatenation of two or more bit-strings. The first bit-string will be the author's ID; the second, a function of the image (an image digest can be obtained using classical cryptographic hash functions or message digest functions). These two bit-strings are necessary to make the watermark pattern depend on both the author's ID and the image content. Additional optional information can be added to the watermark, such as the date and time of the origin of the image, serial number (for tracking purposes should a single copy be distributed to several users), etc. Both the author's ID bit-string and the image digest should have more than 64 bits to prevent a brute-force search for the key under a known-plain-text type of attack.

In Step No. 2 the watermark bit-string is converted into a seed for a cryptographically strong pseudo-random number generator. This conversion can take place by applying a cryptographically strong hash function to the watermark bit-string or by some other conversion that transforms bit-strings into numbers in the range required by the pseudo-random number generator. Again, to prevent a brute-force search for the author's ID using a known-plaintext type of attack, the range of the seed should be more than $2^{64}$. The pseudo-random number generator generates an initial black and white pattern of the same dimensions as the original image to be watermarked. Since this pattern depends sensitively on the seed, it guarantees that the pattern also depends sensitively on each bit of the watermark bit-string.

In Step No. 3 the initial pseudo-random black and white pattern is processed further to create a random collection of connected areas, thereby transforming the spectral energy of the pattern to lower frequencies. This task can be achieved by various means, such as using a spatio-temporal two-dimensional chaotic system. The method proposed in this embodiment uses a cellular automaton with voting rules. Such an automaton has the tendency to coalesce black and white pixels together, thus creating connected areas of black and white pixels. The automaton is described in detail in FIGS. 1B–1E above.

In Step No. 4, to remove edges from the pattern obtained using the cellular automaton, the pattern is smoothed by an averaging operation such as the Laplacian filter. Any other kernel convolution in general will work. This process produces a pattern that is smooth and random looking, with its energy concentrated in the low frequencies. The pattern also depends sensitively on the watermark bit-string.

Finally, in Step No. 5 the amplitude of the smoothened pattern is rescaled to some fixed range so that, when the pattern is laid over the original image, no visible artifacts are created. Based on our experiments, we recommend rescaling the smoothed pattern to gray levels between –8 and 8. The rescaled image is finally added to the original image to get a watermarked version of the original image.

Figure 4:
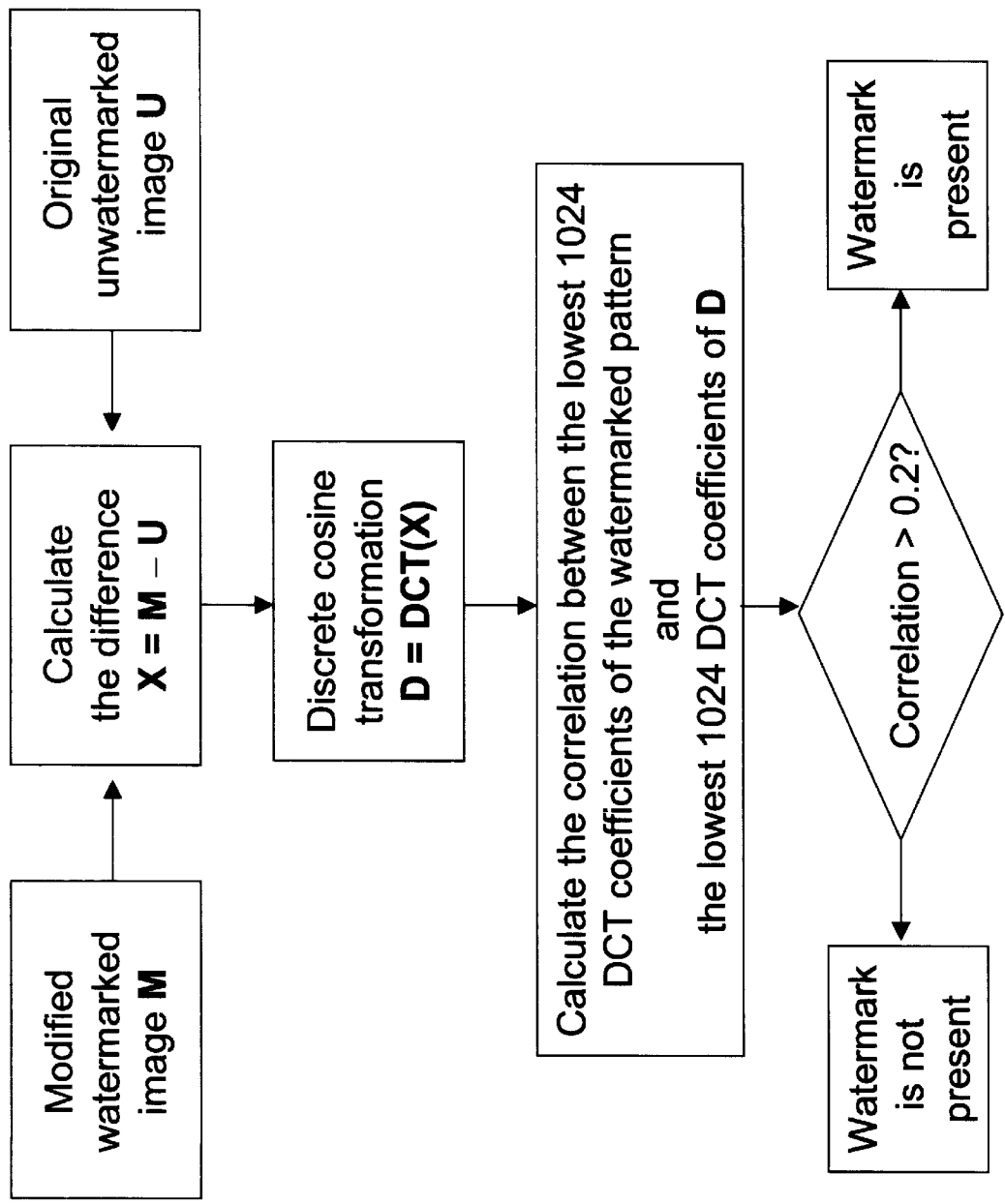
FIG. 4 is a flow chart showing the steps of determining the presence or absence of a watermark in an image.

Referring to FIG. 4, the watermark is retrieved by the following steps. First, subtract the watermarked image from the original to obtain the difference. Then calculate the correlation between the difference thus obtained and the smoothed pattern. From the value of the correlation, decide whether or not the watermark is present. In our experiments, the correlation in Fourier space gave better results than the correlation in the spatial domain.

Denoting the original unwatermarked image as X, the watermarked image as X', the modified watermarked image as X*, the following function was used to decide the presence or absence of a watermark:

$$sim(X^*, X') = \frac{D^* D}{\sqrt{D^* \cdot D^*} \sqrt{D \cdot D}},$$

where $D=Y'-Y$, $D^*=Y^*-Y$, and the symbols Y, Y', and Y* denote the lowest 1024 discrete cosine coefficients that corresponding respectively to X, X', and X*.

The watermarked image shows no visible degradation caused by the overlaid pattern, yet the pattern is robustly embedded. The watermark can be shown to be present even after a number of operations on images: filtering, JPEG compression with a quality factor as low as 5%, cropping, resampling, blurring, downsampling, and adding noise. The watermark also resists a collusion attack (averaging several watermarked images to remove the watermark). A mathematical analysis of robustness is hard to perform because the relationship between the watermark sequence and the final watermark pattern is quite complex. Therefore the robustness of the method has been tested solely by computer simulation.

A digital video is a sequence of digital still images. Therefore the present invention is readily extended to video. A digital video-stream can be watermarked in any of the following ways. First, one can watermark a selection of individual video-frames according to a pseudo-random sequence chosen by means of a password. Second, one can simply watermark all the frames in a video-stream. The first approach is faster, as only some of the frames are watermarked. Of course, this permits an infringer to copy an unwatermarked image and reuse it without detection of the infringement. However, as the infringer cannot know which frames are watermarked and which are not, the risk of undetected infringement is small. Thus, though the second approach offers better security, its heavier burden of computation may not be worthwhile.

Clearly many modifications and variations of the present invention are possible in light of the above teachings. It should therefore be understood that, within the scope of the inventive concept, the invention may be practiced otherwise than as specifically claimed.

What is claimed is:

1. A method of marking, with an invisible identifier that cannot be removed therefrom, an electronic file containing a stream of samples comprising at least one image, which method comprises the steps of:

selecting a first bit-string to represent authorship of said file;

selecting a second bit-string to represent content of said file;

combining said first and said second bit-string into said identifier;

applying a function to convert said identifier into a number in a range effective for seeding a pseudo-random number generator;

deriving a pseudo-random black and white pattern from said number by means of said generator,
     said pattern having dimensions substantially the same as said file;

processing said pattern to create a random collection of connected areas, thereby transforming said pattern's spectral energy to lower frequencies;

smoothing said pattern;

rescaling said smoothed pattern so that its amplitude is more than one unit sample; and adding said rescaled, smoothed pattern to said file, whereby said file is marked with said identifier.

2. The method of claim 1, wherein said step of applying includes a hash function.

3. The method of claim 1, wherein said step of applying includes a message digest function.

4. The method of claim 1, wherein said step of processing includes applying a cellular automaton.

5. The method of claim 4, wherein said cellular automaton has voting rules.

6. The method of claim 4, wherein said cellular automaton has annealing rules.

7. The method of claim 1, wherein said step of processing includes using said pattern as an initial condition for a chaotic spatio-temporal dynamical system.

8. The method of claim 7, wherein said dynamical system tends to create large-scale smooth structures.

9. The method of claim 1, wherein said step of processing includes eliminating high frequencies from said pattern's spectral energy.

10. The method of claim 9, wherein said step of processing includes eliminating said high frequencies by applying at least one low-pass filter.

11. The method of claim 1, wherein said step of combining includes concatenating.

12. The method of claim 1, wherein said step of combining includes alternating bits from said first and said second bit-strings.

13. The method of claim 1, wherein said step of combining includes processing bits from said first and said second bit-strings prior to combining them.

14. The method of claim 13, wherein said step of processing includes applying a hash function to said first string and/or said second string.

15. A method of determining whether or not an electronic file containing at least one image also contains an invisible identifier, which method comprises the steps of:
- subtracting a first modified version of said file from a second modified version thereof to obtain a difference;
- calculating a correlation between said difference and said second modified version; and
- comparing a value of said correlation with a threshold value to determine whether or not said invisible identifier is present in said second modified version.

16. The method of claim 15, wherein said step of evaluating includes evaluating the function $$sim(X^*, X') = \frac{D^* D}{\sqrt{D^* \cdot D^*} \sqrt{D \cdot D}},$$

where said file is X, said first modified version is X', said second modified version is X*, the symbols Y, Y', and Y* denote the lowest 1024 discrete cosine coefficients that correspond respectively to X, X', and X*, and D=Y'−Y, D*=Y*−Y.

17. An invisible identifier irremovably embedded in an electronic file that contains at least one image, said identifier comprising:
- a smoothed, randomized black-and-white pattern;
- said pattern being rescaled to dimensions substantially the same as said file and overlaid thereon;
- said pattern being generated from a combination of a first and a second bit-string;
- said first bit-string being selected to represent authorship of said file; and
- said second bit-string being selected to represent content of said file.

18. The identifier of claim 17, wherein said pattern is processed by a cellular automaton.

19. The identifier of claim 18, wherein said cellular automaton has a voting rule.

20. The identifier of claim 17, wherein said pattern is two-dimensional.

21. A computer-readable storage medium embodying program instructions for a method to mark, with an invisible identifier that cannot be removed therefrom, an electronic file containing a stream of samples comprising at least one image, said method comprising the steps of:
- selecting a first bit-string to represent authorship of said file;
- selecting a second bit-string to represent content of said file;
- combining said first and said second bit-string into said identifier;
- applying a function to convert said identifier into a number in a range effective for seeding a pseudo-random number generator;
- deriving a pseudo-random black and white pattern from said number by means of said generator,
- said pattern having dimensions substantially the same as said file;
- processing said pattern to create a random collection of connected areas, thereby transforming said pattern's spectral energy to lower frequencies;
- smoothing said pattern;
- rescaling said smoothed pattern so that its amplitude is more than one unit sample; and
- adding said rescaled, smoothed pattern to said file, whereby said file is marked with said identifier.

22. A computer-readable storage medium embodying program instructions for a method to determine whether or not an electronic file containing at least one image also contains an invisible identifier, said method comprising the steps of:
- subtracting a first modified version of said file from a second modified version thereof to obtain a difference;
- calculating a correlation between said difference and said second modified version; and
- comparing a value of said correlation with a threshold value to determine whether or not said invisible identifier is present in said second modified version.

* * * * *